(12) United States Patent
Makino et al.

(10) Patent No.: US 8,787,675 B2
(45) Date of Patent: *Jul. 22, 2014

(54) IMAGE PICKUP DEVICE, IMAGE PROCESSING METHOD, AND STORAGE MEDIUM STORING PROGRAM

(71) Applicant: Casio Computer Co., Ltd., Tokyo (JP)

(72) Inventors: Tetsuji Makino, Ome (JP); Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,324

(22) Filed: Dec. 20, 2012

(65) Prior Publication Data

US 2013/0108174 A1 May 2, 2013

Related U.S. Application Data

(62) Division of application No. 12/972,815, filed on Dec. 20, 2010, now Pat. No. 8,345,119.

(30) Foreign Application Priority Data

Dec. 25, 2009 (JP) ................................ 2009-293826

(51) Int. Cl.
*G06K 9/46* (2006.01)
*H04N 5/228* (2006.01)
(52) U.S. Cl.
USPC ........................................ 382/190; 348/222.1
(58) Field of Classification Search
None
See application file for complete search history.

(56) References Cited

U.S. PATENT DOCUMENTS 6,333,993 B1* 12/2001 Sakamoto ..................... 382/173
7,024,040 B1    4/2006 Itokawa
(Continued)

FOREIGN PATENT DOCUMENTS

CN    101326514 A    12/2008
CN    101587586 A    11/2009
(Continued)

OTHER PUBLICATIONS

Japanese Office Action dated Nov. 22, 2011 (and English translation thereof) in counterpart Japanese Application No. 2009-293826.

(Continued)

*Primary Examiner* — Kim Vu
*Assistant Examiner* — Fred Hu
(74) *Attorney, Agent, or Firm* — Holtz Holtz Goodman & Chick PC

(57) ABSTRACT

A method includes specifying an image area which is contained in the subject-present image taken and in which nonflatness is less than or equal to a predetermined value, determining whether or not a range of the specified image area in the subject-present image in which the nonflatness is less than or equal to a predetermined value is greater than or equal to a predetermined range, generating an extraction background image used to extract a subject area in the subject-present image containing the subject, from the image area when the range of the image area in which the nonflatness is less than or equal to a predetermined value is determined to be greater than or equal to the predetermined range, and extracting the subject area from the subject-present image based on information on a difference between each pixel in the extraction background image and a corresponding pixel in the subject-present image.

3 Claims, 7 Drawing Sheets

(56) References Cited

U.S. PATENT DOCUMENTS

| | | | |
|---|---|---|---|
| 7,720,283 B2 | 5/2010 | Sun et al. | |
| 8,116,521 B2 | 2/2012 | Hamada | |
| 2007/0206857 A1* | 9/2007 | Campbell et al. | 382/171 |
| 2009/0290796 A1 | 11/2009 | Shi et al. | |
| 2010/0225787 A1 | 9/2010 | Makino | |
| 2012/0163712 A1 | 6/2012 | Nakajima | |

FOREIGN PATENT DOCUMENTS

| | | |
|---|---|---|
| JP | 6-195460 A | 7/1994 |
| JP | 10-21408 A | 1/1998 |
| JP | 11-039479 A | 2/1999 |
| JP | 11-110559 A | 4/1999 |
| JP | 2000-022943 A | 1/2000 |
| JP | 2000-048120 A | 2/2000 |
| JP | 2001-076161 A | 3/2001 |
| JP | 2002-117409 A | 4/2002 |
| JP | 2002-166608 A | 6/2002 |
| JP | 2002-312795 A | 10/2002 |
| JP | 2004-179740 A | 6/2004 |
| JP | 2004-258927 A | 9/2004 |
| JP | 2005-295163 A | 10/2005 |
| JP | 2006-180424 A | 7/2006 |
| JP | 2007-140834 A | 6/2007 |
| JP | 2007-235953 A | 9/2007 |
| JP | 2007-328694 A | 12/2007 |
| JP | 2008-048251 A | 2/2008 |
| JP | 2008-092120 A | 4/2008 |
| JP | 2009-277222 A | 11/2009 |
| WO | WO 2007/070290 A1 | 6/2007 |

OTHER PUBLICATIONS

Chinese Office Action dated Sep. 4, 2012 (and English translation thereof) in counterpart Chinese Application No. 201010625241.7.

* cited by examiner

IMAGE PICKUP DEVICE, IMAGE PROCESSING METHOD, AND STORAGE MEDIUM STORING PROGRAM

CROSS-REFERENCE TO RELATED APPLICATIONS

This application is based upon and claims the benefit of priority from Japanese Patent Application No. 2009-293826, filed Dec. 25, 2009; the entire contents of which are incorporated herein by reference.

BACKGROUND OF THE INVENTION

1. Field of the Invention

The present invention relates to an image pickup device, an image processing method, and a storage medium storing a program, capable of extracting a subject area from a taken image.

2. Description of the Related Art

An application has been known which uses an image pickup device to take an image with a subject present in a background and a background image in which the subject is not present and to generate difference information based on the background image and the image with the subject present in the background so as to allow only the subject to be extracted (for example, Jpn. Pat. Appln. KOKAI Publication No. 10-21408).

However, in a conventional subject extraction process, if the subject contains separate areas in an image in which a background image and the subject are present, only the single largest connected area included in the separate areas is extracted as a subject. Thus, disadvantageously, the subject cannot be appropriately extracted.

Furthermore, a background image used to extract the subject is required for each image in which the subject is present. Thus, in continuous shooting performed with a constant movement of the image pickup device, obtaining the background image corresponding to each taken image is difficult. As a result, disadvantageously, the subject cannot be appropriately extracted.

BRIEF SUMMARY OF THE INVENTION

Accordingly, it is an object of the present invention to provide an image pickup device, an image processing method, and a storage medium storing a program, capable of easily and appropriately extracting a subject area from a taken image.

According to one aspect of the present invention, there is provided an image pickup device comprising: an image pickup section configured to take a subject-present image with a subject present in a background; a specification section configured to specify an image area which is contained in the subject-present image taken by the image pickup section and in which nonflatness is less than or equal to a predetermined value; a determination section configured to determine whether or not a range of the image area in the subject-present image specified by the specification section and in which the nonflatness is less than or equal to a predetermined value is greater than or equal to a predetermined range; a background generation section configured to generate an extraction background image used to extract a subject area in the subject-present image containing the subject, from the image area when the determination section determines that the range of the image area in which the nonflatness is less than or equal to a predetermined value is greater than or equal to the predetermined range; and a subject extraction section configured to extract the subject area from the subject-present image to obtain a subject area image, based on information on a difference between each pixel in the extraction background image and a corresponding pixel in the subject-present image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Specific aspects of the present invention will be described below with reference to the drawings. However, the scope of the present invention is not limited to the illustrated examples.

Figure 1:
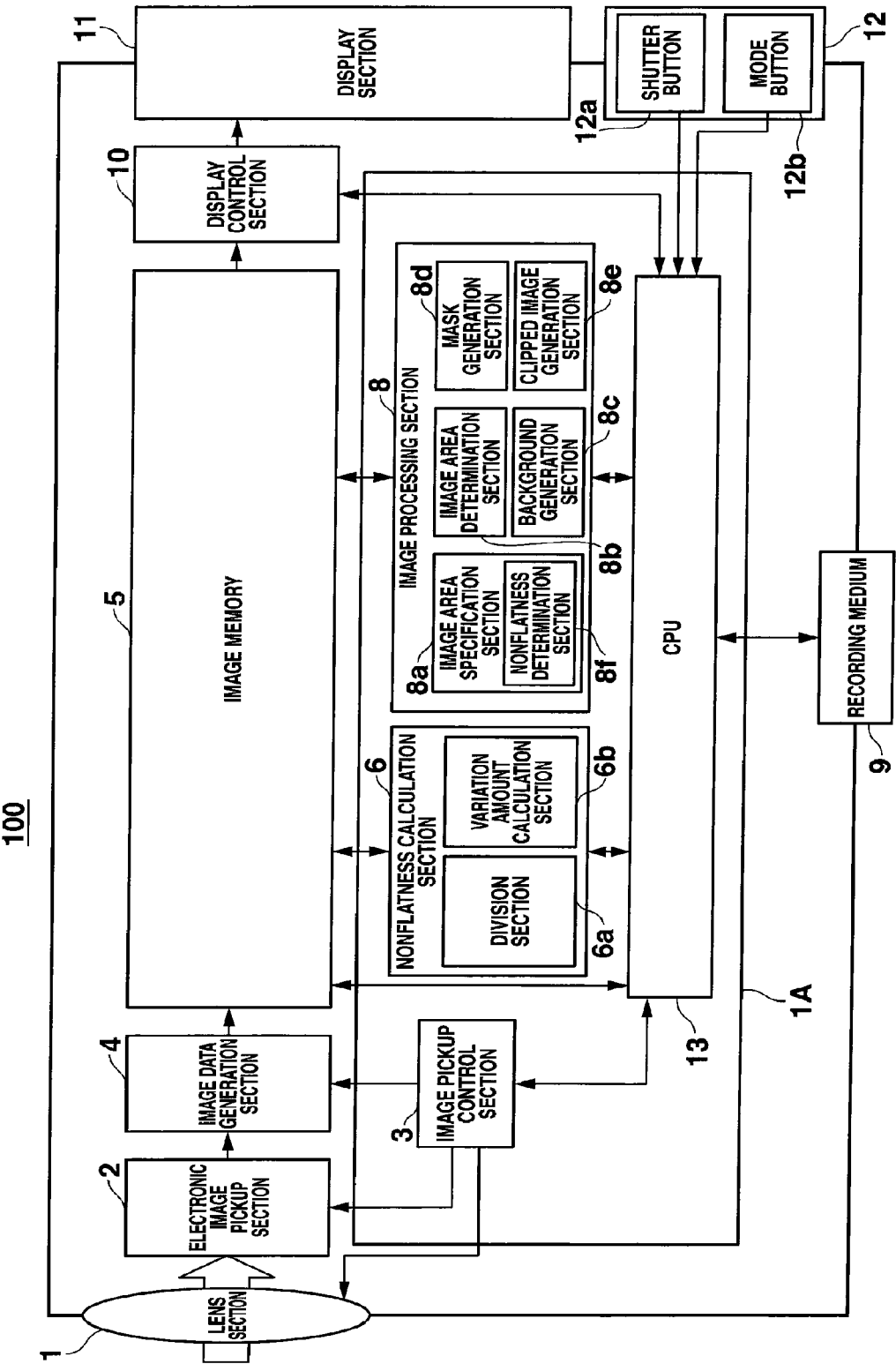
FIG. 1 is a block diagram schematically showing the configuration of an image pickup device according to an embodiment to which the present invention is applied.

FIG. 1 is a block diagram schematically showing the configuration of an image pickup device 100 according to an embodiment to which the present invention is applied.

When the range of image areas in which a subject-present image P1 (FIG. 5A) with a subject S present in a background has a nonflatness of at most a predetermined value is determined to be greater than or equal to a predetermined range, the image pickup device 100 according to the present embodiment generates, from the subject-present image P1, an extraction background image used to extract a subject area. Then, based on information on the difference between each pixel in the extraction background image and the corresponding image in the subject-present image P1, the image pickup device 100 extracts the subject area from the subject-present image P1.

Specifically, as shown in FIG. 1, the image pickup device 100 includes a lens section 1, an electronic image pickup section 2, an image pickup control section 3, an image data generation section 4, an image memory 5, a nonflatness calculation section 6, an image processing section 8, a recording medium 9, a display control section 10, a display section 11, an operation input section 12, and a CPU 13.

Furthermore, the image pickup control section 3, the nonflatness calculation section 6, the image processing section 8, and the CPU 13 are designed as, for example, a custom LSI 1A.

The lens section 1 includes a plurality of lenses including a zoom lens and a focus lens.

Additionally, the lens section 1 may include a zoom driving section configured to move the zoom lens in the direction of an optical axis while an image of the subject S is being taken and a focusing driving section configured to move the focus lens in the direction of an optical axis while an image of the subject S is being taken, through the zoom driving section and the focusing driving section are not shown in the drawings.

The electronic image pickup section 2 includes an image sensor such as a charge-coupled device (CCD) or complementary metal-oxide semiconductor (CMOS) to convert an optical image having passed through the various lenses of the lens section 1 into a two-dimensional image signal.

The image pickup control section 3 includes a timing generator and a driver (not shown in the drawings). The image pickup control section 3 allows the timing generator and the driver to drivingly scan the electronic image pickup section 2. Thus, the image pickup control section 3 allows the electronic image pickup section 2 to convert an optical image into a two-dimensional signal at every predetermined period. The image pickup section 3 then reads an image frame for each screen from the image taking area of the electronic image pickup section 2. The image pickup control section 3 then outputs the image frame to the image data generation section 4.

Furthermore, the image pickup control section 3 adjustably controls image taking conditions for the subject S such as automatic focusing (AF), automatic exposure (AE), and automatic white balance (AWB).

The lens section 1, the electronic image pickup section 2, and the image pickup control section 3 form image pickup means for taking a subject-present image P1 (FIG. 5A) in which the subject is present in the background. The subject S may include separate areas as in the case of, for example, a character string written on a whiteboard W.

The image data generation section 4 appropriately adjusts the gain of an image frame signal with an analog value transferred by the electronic image pickup section 2, for each color component, that is, R, G, and B. The image data generation section 4 allows a sample hold circuit (not shown in the drawings) to sample and hold the resultant signal. The image generation section 4 then allows an analog-to-digital converter (not shown in the drawings) to convert the signal into digital data. The image data generation circuit 4 then allows a color process circuit (not shown in the drawings) to execute color processing including a pixel interpolation process and a γ compensation process on the signal. The image data generation section 4 thus generates a luminance signal Y and color difference signals Cb and Cr (YUV data) with digital values.

The luminance signal Y and color difference signals Cb and Cr output by the color process circuit are DMA-transferred to the image memory 5, used as a buffer memory.

A mosaic section (not shown in the drawings) configured to develop digital data subjected to analog-to-digital conversion may be incorporated in the custom LSI 1A.

The image memory 5 includes, for example, DRAM to store data and the like which are processed by the nonflatness calculation section 6, the image processing section 8, the CPU 13, and the like.

The nonflatness calculation section 6 operates as nonflatness calculation means to calculate the nonflatness of the subject-present image P1. Specifically, the nonflatness calculation section 6 includes a division section 6a and a variation amount calculation section 6b.

Figure 5A:
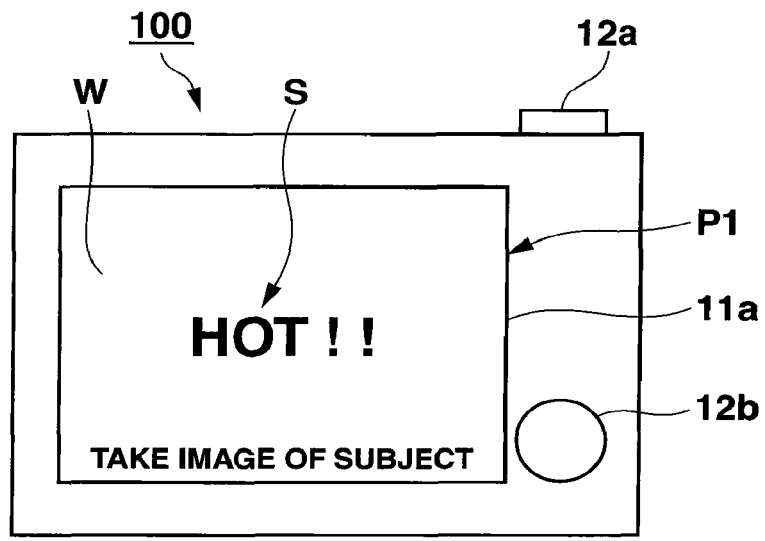
FIGS. 5A, 5B, and 5C are diagrams schematically showing examples of images used to describe the subject clipping process in FIG. 2.
Figure 5B:
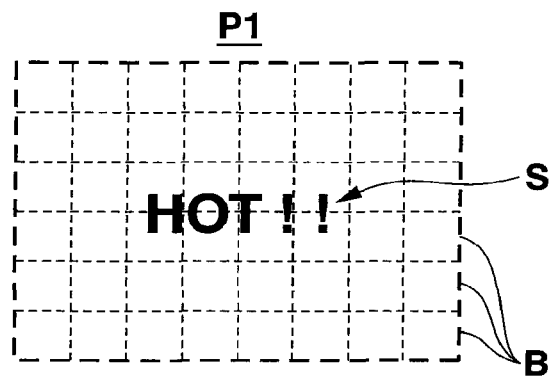

The division section 6a operates during a background generation process to divide the subject-present image P1 into a plurality of image blocks B based on YUV data on the subject-present image P1 (FIG. 5B).

Here, the division section 6a forms division means for dividing the subject-present image P1 into the plurality of image blocks (image areas) B.

The variation amount calculation section 6b calculates the amount of variation (nonflatness) among the pixel values in the image block B, resulting from the division by the division section 6a. Specifically, the variation amount calculation section 6b operates during the background generation process to calculate a standard deviation in accordance with Expression (1) as a variation amount for each of the plurality of image blocks B, in the subject-present image P1.

$$\overline{b} = \frac{1}{N}\sum_{n=1}^{N} b_n \qquad (1)$$

$$\sigma_b = \sqrt{\frac{1}{N-1}\sum_{n=1}^{N}(b_n - \overline{b})^2}$$

$b_n$: Pixel values in block,
N: Number of pixels in block,
$\overline{b}$: Average of pixel values in block,
$\sigma b$: Standard deviation in block In Expression (1), b: the pixel values in each block area are, for example, luminance values.

The image processing section 8 includes an image area specification section 8a, an image area determination section 8b, a background generation section 8c, a mask generation section 8d, and a clipped image generation section 8e.

The image area specification section 8a specifies image areas contained in the subject-present image and having a nonflatness of at most a predetermined value. Specifically, the image area specification section 8a includes a nonflatness determination section 8f configured to make determination for the nonflatness of each of the image blocks B calculated by the nonflatness calculation section 6. Based on determination results from the nonflatness determination section 8f, the image area specification section 8a specifies the image blocks B with a nonflatness of at most the predetermined value.

That is, the nonflatness determination section 8f operates during the background generation process to determine whether or not the amount of variation among the pixel values in the block is less than or equal to the predetermined value. By way of example of determination, those of the plurality of image blocks B in the subject-present image P1 which contain the subject S (shaded portion of FIG. 5C) have a large variation amount. Thus, the nonflatness determination section 8f avoids determining that the amount of variation among the pixel values is less than or equal to the predetermined value. On the other hand, those of the plurality of image blocks B in the subject-present image P1 which do not contain the subject S have a much smaller variation amount than the image blocks B containing the subject S. Thus, the nonflatness determination section 8f determines that the amount of variation among the pixel values is less than or equal to the predetermined value.

The image area specification section 8a specifies an image area containing at least one image block B in which the pixel values are determined by the nonflatness determination section 8f to have a nonflatness of at most the predetermined value.

Here, the image area specification section 8a forms specification means for specifying image areas contained in the subject-present image P1 and having a nonflatness of at most the predetermined value.

The image area determination section 8b forms determination means for determining whether or not the number of image blocks B in the subject-present image P1 in which the pixel values have a variation amount of at most the predetermined value is greater than or equal to a required block number.

That is, for example, depending on whether or not the number of image blocks B in the subject-present image P1 in which the pixel values have a variation amount of at most the predetermined value is greater than or equal to the required block number, the image area determination section 8b determines whether or not the range of the image areas in the subject-present image P1 which have a nonflatness of at most the predetermined value is greater than or equal to a predetermined range.

The required block number is preset and is optional. For example, the required block number is set equal to half the total number Bmax of image blocks B.

The background generation section 8c generates an extraction background image adapted to extract a subject area utilizing the chroma key technique.

That is, when the image area determination section 8b determines that the number of image blocks B in the subject-present image P1 in which the pixel values have a variation amount of at most the predetermined value is greater than or equal to the required block number, the background generation section 8c generates an extraction background image with a background color almost equal to the color of the image block B. For example, as shown in FIG. 5A, when an image of the subject S is taken against a solid background as in the case of the whiteboard W, the background generation section 8c generates an extraction background image in a color almost equal to that of the solid background.

Chroma key is a technique to clip the subject S from image data using a particular color background. Chroma key normally uses, as a background, a blue or green screen that is in a complementary color relationship with the subject S. The chroma key technique generates an extraction background image in a color almost equal to that of the image blocks B in the subject-present image P1 in which the amount of variation among the pixel values is less than or equal to the predetermined value. This allows the background portion and the subject portion to be separated from each other based on color information on the extraction background image and the subject-present image P1.

Here, the background generation section 8c forms background generation means operating as follows. When the range of the image areas in the subject-present image P1 which have a nonflatness of at most the predetermined value is determined to be greater than or equal to the predetermined range, the background generation section 8c generates an extraction background image adapted to extract a subject area in the subject-present image P1 which contains the subject S, from the image area contained in the subject-present image P1 and having a nonflatness of at most the predetermined value.

Figure 6A:
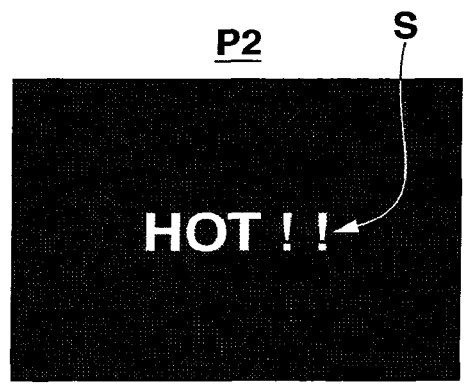
FIGS. 6A and 6B are diagrams schematically showing examples of images used to describe the subject clipping process in FIG. 2.

The mask generation section 8d generates a mask image P2 (FIG. 6A) adapted to extract the subject area from the subject-present image P1.

That is, the mask generation section 8d calculates the difference D between each pixel in the extraction background image and the corresponding pixel in the subject-present image P1 in accordance with Expression (2) to generate a difference map.

$$D=(Yc-Y)^2+G\times((Uc-U)^2+(Vc-V)^2) \quad (2)$$

In Expression (2), YUV data on the background image is denoted by "Y", "U", and "V". YUV data on the subject-present image is denoted by "Yc", "Uc", and "Vc". Furthermore, G denotes the gain of color difference signals U and V.

The mask generation section 8d binarizes the generated difference map (0, 255) using a predetermined threshold value to generate a mask image P2.

Furthermore, the mask generation section 8d executes a contraction process for removing fine noise, to remove a set of pixels with a value smaller than a predetermined one. The mask generation section 8d executes an expansion process for compensating for the contraction. The mask generation section 8d then executes a labeling process for attaching the same number to a set of pixels forming the same connected component to replace each area accounting for at most a predetermined rate of the number of pixels forming an effective area, with an effective area for compensation. Moreover, the mask generation section 8d subjects area information to an averaging filter to apply synthetic gradation to the edge of each area.

The clipped image generation section 8e synthesizes an image of the subject S with a single-color background image P4 to generate image data on a subjected clipped image P3.

Figure 6B:
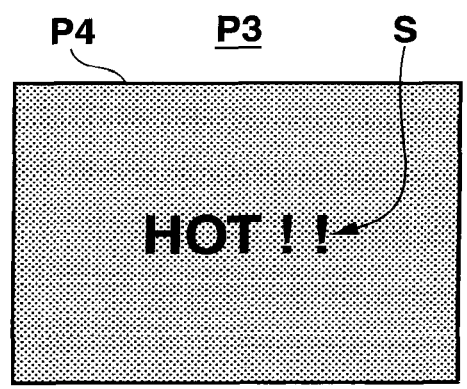
Figure 7A:
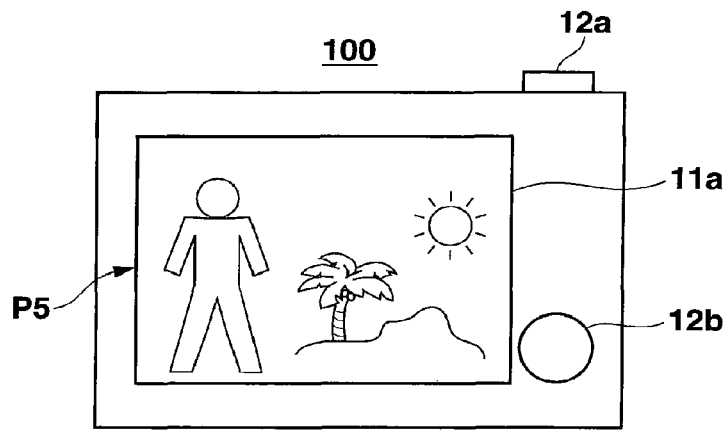
FIGS. 7A, 7B, and 7C are diagrams schematically showing examples of images used to describe a synthesis process.
Figure 7B:
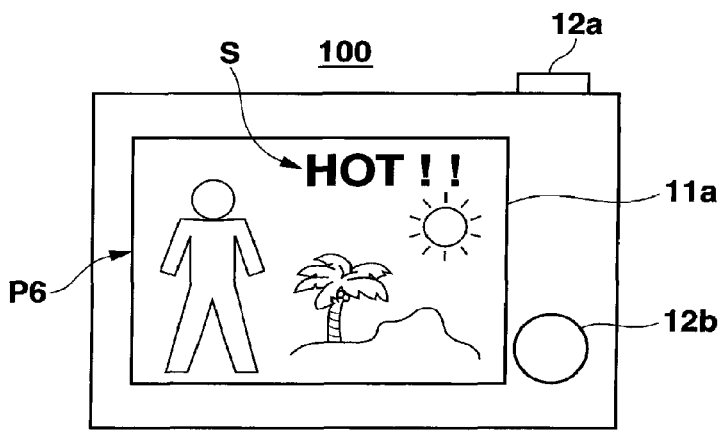
Figure 7C:
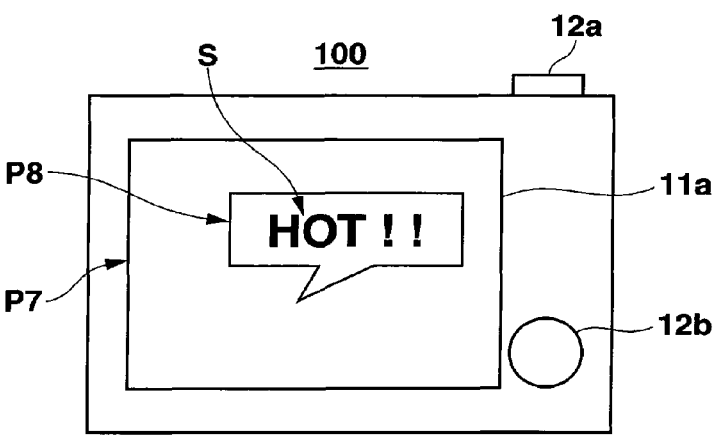

That is, the clipped image generation section 8e utilizes the chroma key technique to clip a subject area from the subject-present image P1 using the mask image P2 generated by the mask generation section 8d. The clipped image generation section 8e then synthesizes the subject area with the single-color background image P4 to generate image data on the subject clipped image P3 (FIG. 6B). Since the synthetic gradation is applied to the edge portion of the mask image P2, the subject area and the single-color background image P4 can be synthesized such that the boundary portion between the clipped subject area and the single-color background image P4 appears unclear and thus natural. The color of the single-color background image P4 is optional and may be, for example, gray.

Here, the clipped image generation section 8e forms subject extraction means for extracting a subject area from the subject-present image P1 based on information on the difference between each pixel in the extraction background image and the corresponding pixel in the subject-present image P1.

The recording medium 9 includes, for example, a nonvolatile memory (flash memory) or the like to store image data for recording of taken images coded by a JPEG compression section (not shown in the drawings) of the image processing section 8.

Furthermore, the mask image P generated by the mask generation section 8d of the image processing section 8 and the image data on the subject clipped image P3 are compressed and associated with each other. The mask image P and the image data are saved to the recording medium 9 with the extension of the image data set to ".jpe".

The display control section 10 controllably allows display image data temporarily stored in the image memory 5 to be read and displayed on the display section 11.

Specifically, the display control section 10 includes VRAM, a VRAM controller, and a digital video controller. Under the control of the CPU 13, the digital video encoder periodically reads the luminance signal Y and color difference signals Cb and Cr read from the image memory 5 and stored in VRAM (not shown in the drawings). The digital video encoder then generates a video signal based on these data and outputs the signal to the display section 11.

The display section 11 is, for example, a liquid crystal display apparatus, and displays, for example, an image taken by the electronic image pickup section 2, on a display screen 11a based on the video signal from the display control section 10. Specifically, in an image taking mode, the display section 11 displays a live view image based on a plurality of image frames generated by the image taking of the subject S performed by the electronic image pickup section 2 and the image pickup control section 3. Alternatively, the display section 11 displays a REC view image taken as the taken image.

The operation input section 12 is configured to perform predetermined operations of the image pickup device 100. Specifically, the operation input section 12 includes a shutter button 12a configured to issue an instruction to take an image of the subject S, a mode button 12b configured to issue an instruction to select any of image taking modes, functions, and the like, and zoom button (not shown in the drawings) relating to an instruction for adjusting the amount of zoom. In response to an operation of any of the button, the operation input section 12 outputs a predetermined operation signal to the CPU 13.

The CPU 13 controls the sections of the image pickup device 100. Specifically, the CPU 13 performs various control operations in accordance with various processing programs (not shown in the drawings) for the image pickup device 100. The various processing programs for the image pickup device 100 are stored in ROM (not shown in the drawings) and read and processed by the CPU 13 in accordance with the contents of processing.

Now, a subject clipping process executed by the image pickup device 100 according to an image processing method will be described with reference to FIGS. 2 to 8.

Figure 2:
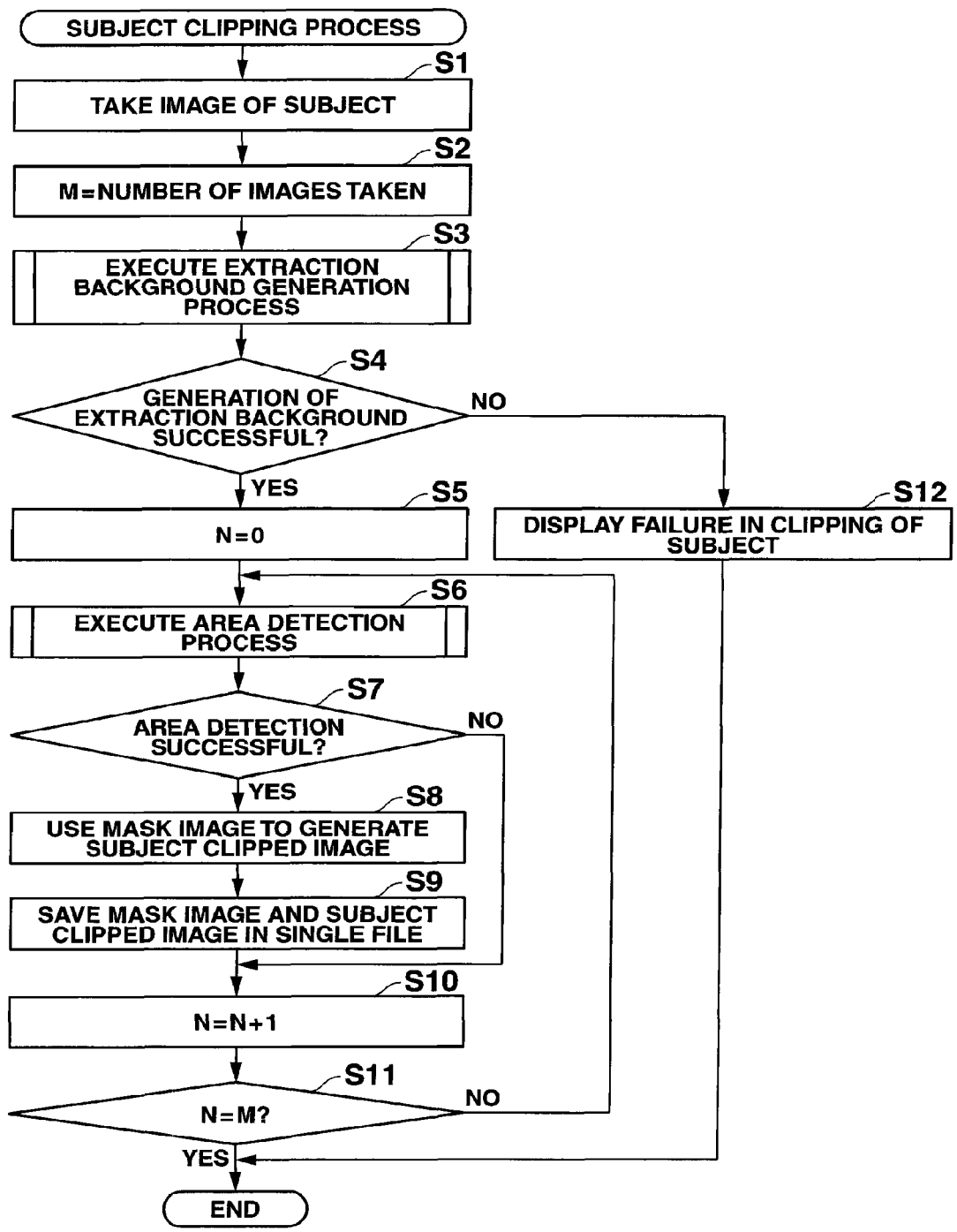
FIG. 2 is a flowchart showing an example of an operation based on a subject clipping process executed by the image pickup device in FIG. 1.
Figure 3:
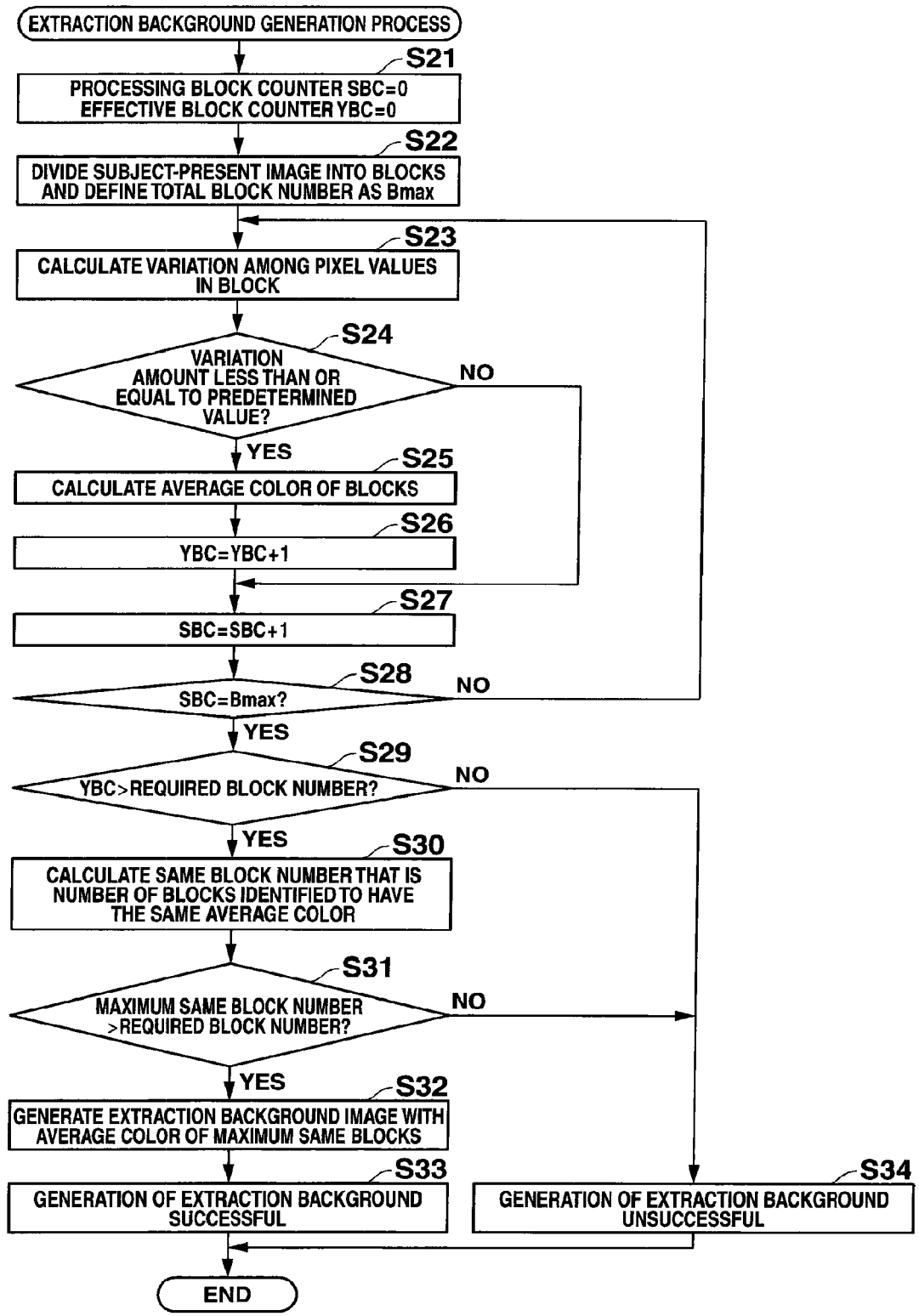
FIG. 3 is a flowchart showing an example of an operation according to a background generation process in the subject clipping process in FIG. 2.

FIGS. 2 and 3 are flowcharts showing an example of an operation according to the subject clipping process.

The subject clipping process is executed when an instruction to select a subject clipping mode from a plurality of image taking modes displayed on a menu screen is issued based on a predetermined operation of the mode button 12b on the operation input section 12.

In the description below, by way of example, the subject is a character string written on the whiteboard W, and the number of times (M) that an image of the subject S is taken is one. However, in a mode in which an image of a predetermined subject is taken with a constant movement of the image pickup device 100 in a predetermined direction, an image of the subject may be taken a plurality of times.

As shown in FIG. 2, first, based on the user's predetermined operation of the shutter button 12a, the image pickup control section 3 allows the electronic image pickup section 2 to take an optical image of the subject S (for example, a character string written on the whiteboard) (step S1). Then, based on image frames of the subject-present image P1 transferred by the electronic image pickup section 2, the image data generation section 4 generates YUV data on the subject-present image P1.

Alternatively, based on the processing in step S1, under the control of the CPU 13, the display control section 10 may allow the subject-present image P1 to be displayed on the display screen 11a of the display section 11.

Then, the CPU 13 sets the number of images taken in step S1 to be a constant M (for example, M=1) (step S2). The CPU 13 writes the constant M to the image memory.

Then, the CPU 13 allows the nonflatness calculation section 6 and the image processing section 8 to execute an extraction background generation process for generating an extraction background image adapted to extract a subject area from the subject-present image P1 (step S3).

Now, the extraction background generation process will be described in detail with reference to FIG. 3.

FIG. 3 is a flowchart showing an example of an operation according to the extraction background generation process.

As shown in FIG. 3, first, the CPU 13 sets each of a processing block counter SBC and an effective block counter YBC to an initial value of 0 (step S21). The CPU 13 writes the initial values to the image memory 5.

Then, based on the YUV data on the subject-present image P1, the division section 6a divides the subject-present image P1 into a plurality of image blocks B (FIG. 5B) and sets the number of the resultant plurality of blocks to a constant Bmax (step S22). The division section 6a writes the constant Bmax to the image memory 5.

Subsequently, for those of the plurality of image blocks B of the subject-present image P1 for which a standard deviation as the variation amount of the pixel values has not been calculated, the variation amount calculation section 6b calculates a standard deviation as the variation amount of the pixel values for one of the above-described image blocks B in accordance with Expression (1).

$$\bar{b} = \frac{1}{N}\sum_{n=1}^{N} b_n \qquad (1)$$

$$\sigma_b = \sqrt{\frac{1}{N-1}\sum_{n=1}^{N}(b_n - \bar{b})^2}$$

$b_n$: Pixel values in block,
N: Number of pixels in block,
$\bar{b}$: Average of pixel values in block,
$\sigma_b$: Standard deviation in block Then, the nonflatness determination section 8f determines whether or not the calculated variation amount in the image block B is less than or equal to a predetermined value (step S24).

Here, when the variation amount is determined to be less than or equal to the predetermined value (step S24; YES), the image processing section 8 calculates an average color for the image blocks B for which the variation amount is determined in step S24 to be less than or equal to the predetermined value (step S25). The CPU 13 adds 1 to the effective block counter YBC (YBC=YBC+1) (step S26).

CPU 13 adds 1 to the processing block counter (SBC=SBC+1) (step S27).

On the other hand, in step S24, if the variation amount is determined not to be less than or equal to the predetermined value (step S24; NO), the CPU 13 avoids executing the processing in steps S25 and S26 and shifts the processing to step S27 to add 1 to the processing block counter SBC (SBC=SBC+1).

After the processing in step S27, the CPU 13 determines whether or not the value in the processing block counter SBC is equal to the total number Bmax of image blocks (step S28).

Here, when the value in the processing block counter SBC is determined not to be equal to the total number Bmax of image blocks (step S28; NO), the CPU 13 shifts to step S23 where the CPU 13 allows the relevant sections to execute the subsequent processing. That is, the variation amount calculation section 6b calculates a standard deviation as the variation amount of the pixel values for all the image blocks B. The nonflatness determination section 8f determines whether or not the variation amount of the pixel values is less than or equal to the predetermined value. Then, the CPU 13 counts the number of image blocks B in which the variation amount is less than or equal to the predetermined value, based on the value in the block counter YBC.

Determining in step S28 that the value in the processing block counter SBC is equal to the total number Bmax of image blocks (step S28; YES) indicates completion of the calculation of the standard deviation as the variation amount of the pixel values for all the pixel blocks and the determination of whether or not the variation amount is less than or equal to the predetermined value.

Then, when the value in the processing block counter SBC is determined to be equal to the total number Bmax of image blocks (step S28; YES), the image area determination section 8b determines whether or not the value in the effective block counter YBC is greater than or equal to the required block number (step S29).

In step S29, when the value in the effective block counter YBC is determined to be greater than or equal to the required block number (step S29; YES), for the image blocks B for which the variation amount is determined to be less than or equal to the predetermined value, the image processing section 8 calculates the same block number that is the number of blocks that can be identified to be in the same color (step S30).

Then, the image area determination section 8b determines the largest of the same block numbers to be the maximum same block number. The image area determination section 8b then determines whether or not the maximum same block number is greater than or equal to the required block number (step S31).

In step S31, when the maximum same block number is determined to be greater than or equal to the required block number (step S31; YES), the background generation section 8c generates YUV data on an extraction background image with a background color that is the average color of the image blocks B corresponding to the maximum same block number (step S32). Thus, the background generation section 8c indicates successful generation of an extraction background (step S33).

On the other hand, if the maximum same block number is determined not to be greater than or equal to the required block number (step S31; NO), the background generation section 8c avoids generating an extraction background image and indicates a failure to generate an extraction background (step S34): this is because, for example, even when there are stable image blocks B with no variation, if the number of blocks in almost the same color is not less than or equal to the required block number, then the background cannot be identified.

Furthermore, in step S29, if the value in the effective block counter YBC is determined not to be greater than or equal to the required block number (step S29; NO), since the background cannot be identified because of the lack of stable image blocks B with no variation, the background generation section 8c avoids generating an extraction background image and indicates a failure to generate an extraction background (step S34).

Thus, the extraction background generation process is finished.

As shown in FIG. 3, the CPU 13 then allows the background generation section 8c to determine whether or not extraction background generation has succeeded (step S4).

Here, when extraction background generation is determined to have succeeded (step S4; YES), the CPU 13 sets a counter N configured to manage the number of taken images for which the subject clipping process has been completed, to an initial value of 0 (step S5). The CPU 13 then writes the initial value to the image memory 5.

Then, the CPU 13 allows the image processing section 8 to execute an area detection process for detecting a subject area containing the subject S in the subject-present image P1, on one of the taken images not subjected to the area detection process yet (step S6).

Now, the area detection process will be described in detail with reference to FIG. 4.

Figure 4:
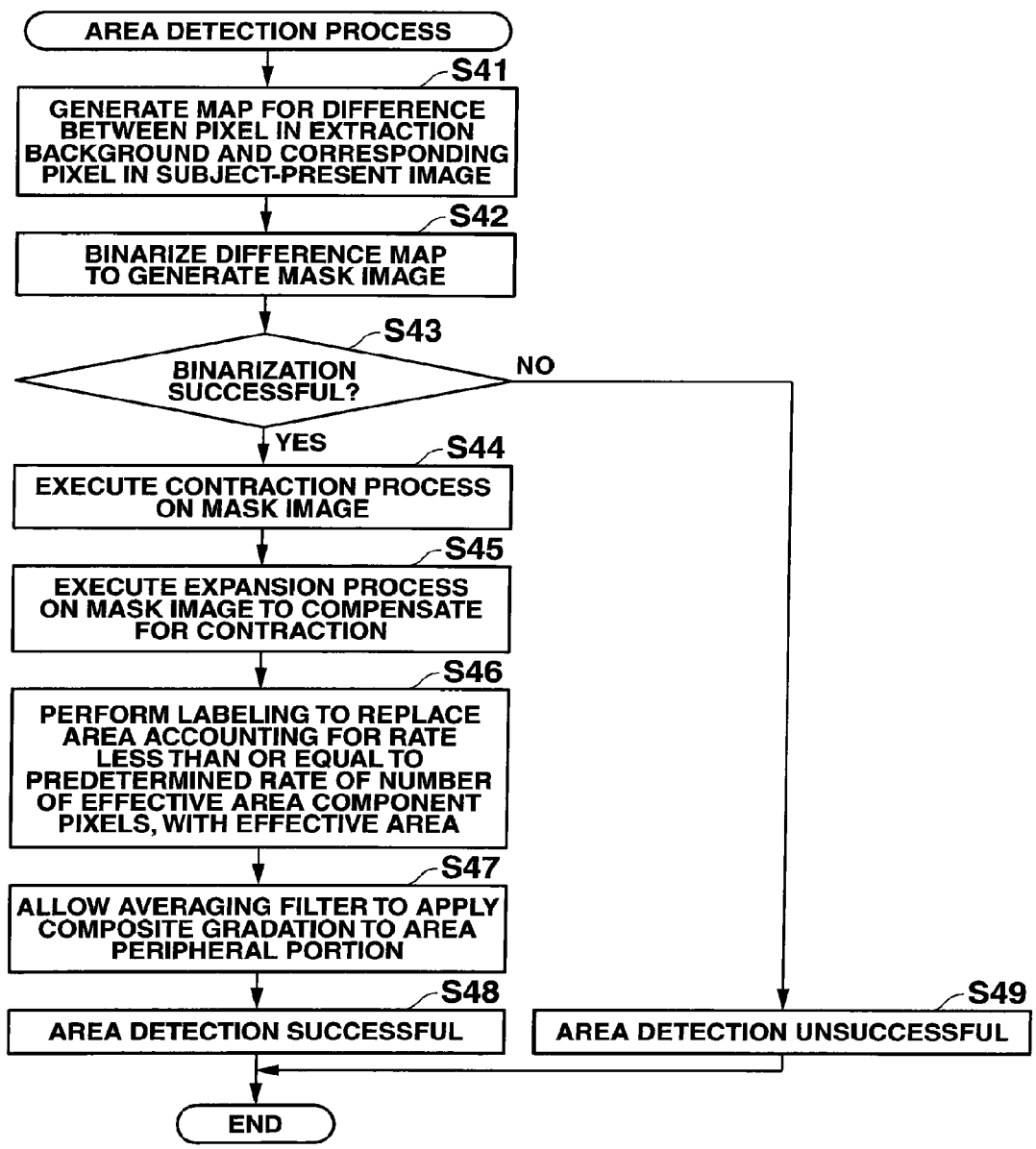
FIG. 4 is a flowchart showing an example of an operation according to an area detection process in the subject clipping process in FIG. 2.

FIG. 4 is a flowchart showing an example of an operation according to the area detection process.

As shown in FIG. 4, the mask generation section 8d of the image processing section calculates the difference D between each pixel in the YUV data on the extraction background image (background image) and the corresponding pixel in the YUV data on the subject-present image P1 in accordance with Expression (2) to generate a difference map (step S41).

$$D=(Yc-Y)^2+G\times((Uc-U)^2+(Vc-V)^2) \qquad (2)$$

Then, the mask generation section 8d binarizes the generated difference map using a predetermined threshold value to generate mask image data (step S42). Then, by determining whether or not the area of the background (binarized value: 0) is significantly small, the mask generation section 8d determines whether or not the binarization has succeeded (step S43).

Here, when the binarization is determined to have succeeded (step S43; YES), the mask generation section 8d executes a contraction process on the mask image data to remove a set of pixels with a value smaller than the predetermined one (step S44) in order to correct the excess remaining of the peripheral portion of the subject area and to remove fine noise. The mask generation section 8d then executes an expansion process to compensate for the contraction (step S45).

Subsequently, if the subject S has a color similar to the background color, the inside of the subject area in the mask image P2 may be partly lost. The mask generation section 8d thus executes a labeling process to attach the same number to a set of pixels forming the same connected component. Hence, the mask generation section 8d replaces each area accounting for a predetermined rate of the number of pixels forming the effective area in the mask image data, with an effective area for compensation (step S46).

Thereafter, the mask generation section 8d subjects the mask image data to the averaging filter to apply synthetic gradation to the edge of the subject area (step S47). The mask generation section 8d thus indicates successful area detection (step S48).

On the other hand, in step S43, when the binarization is determined not to have succeeded (step S43; NO), if for example, the area of the background (binarized value: 0) is significantly small, the mask generation section 8d determines the binarization to have failed. Hence, the mask generation section 8d indicates a failure in area detection (step S49).

Thus, the area detection process has failed.

After the area detection process (step S6) is finished, the CPU 13 allows the mask generation section 8d to determine whether or not detection of a subject area has been succeeded (step S7).

Here, when the detection of a subject area is determined to have succeeded (step S23; YES), the CPU 13 allows the clipped image generation section 8e to utilize the chroma key technique to clip a subject area from the subject-present image P1 using the mask image P2 generated by the area detection process. The CPU 13 then allows the clipped image generation section 8e to synthesize the subject area with the single-color background image P4 to generate image data on the subject clipped image P3 (FIG. 6B) (step S8).

Specifically, the clipped image generation section 8e reads and expands the subject-present image P1, the single-color background image P4, and the mask image data, into the image memory 5. The clipped image generation section 8e then fills in, in the predetermined single color of the single-color background image P4, pixels in the subject-present image P1 which are covered with a filled-in portion (which is other than the subject S) of the mask image data. On the other hand, the clipped image generation section 8e avoids processing the pixels in the subject portion to prevent the predetermined single color from passing through the subject portion. Since the synthetic gradation is applied to the edge portion of the mask image P2, the boundary portion between the clipped subject area and the single-color background image P4 appears unclear and thus natural.

Then, the CPU 13 saves the mask image generated by the mask generation section 8d of the image processing section 8 and the image data on the subject clipped image P3, to the recording medium 9 in a single file so that the mask image P and the image data are associated with each other and so that the extension of the image data on the subject clipped image P3 is set to ".jpe" (step S9).

Thereafter, the CPU 13 adds 1 to the counter N (step S10).

On the other hand, in step S7, when detection of a subject area is determined to have failed (step S7; NO), the CPU 13 avoids executing steps S8 and S9 and shifts the processing to step S10 to add 1 to the counter N.

After the processing in step S10, the CPU 13 determines whether or not the value in the counter N is equal to the number M of the taken images (step S11).

Here, when the value in the counter N is determined not to be equal to the number M of the taken images (step S11; NO), the CPU 13 shifts the processing to step S6 to execute the subsequent processing. That is, for all the taken images, the CPU 13 determines whether or not the area detection process and the detection of a subject area have succeeded, generates image data on the subject clipped image P3 if the detection of a subject area has succeeded, and subsequently saves the image data on the subject clipped image P3.

On the other hand, in step S11, when the value in the counter N is determined to be equal (step S11; YES), the CPU 13 terminates the subject clipping process.

In step S4, when the generation of an extraction background is determined not to have succeeded (step S4; NO), the display control section 10 allows a predetermined message (for example, "Clipping of subject has failed") concerning a failure in clipping of the subject S to be displayed on the display screen 11a of the display section 11 (step S12). The display control section 10 terminates the subject clipping process.

As described above, the image pickup device 100 according to the present embodiment operates as described below when the image areas in the subject-present image P1 with the subject S present in the background are specified which areas have a nonflatness of at most the predetermined value and when the range of the image areas contained in the subject-present image P1 and having a nonflatness of at most the predetermined value is determined to be greater than or equal to the predetermined range. That is, the image pickup device 100 according to the present embodiment generates an extraction background image used to extract a subject area from the subject-present image P1, and extracts the subject area from the subject-present image P1 to generate a subject clipped image P3, based on the difference D between each pixel in the extraction background image and the corresponding pixel in the subject-present image P1. Namely, the image pickup device 100 can extract an area that is not flat with respect to the extraction background image, as a subject forming area. Thus, even if the subject area includes separate areas as in the case of characters instead of being formed as one continuous area, the image pickup device 100 can extract each of the areas.

Hence, a subject area including separate component areas can be easily and appropriately extracted from the subject-present image P1.

Furthermore, if images of the subject S are consecutively taken with a constant movement of the image pickup device 100, then provided that the range of the image areas contained in each subject-present image P1 and having a nonflatness of at most the predetermined value is greater than or equal to the predetermined range, generating only one extraction background image used to extract a subject area allows the subject S to be easily and appropriately extracted from each subject-present image P1.

Additionally, the image pickup device 100 divides the subject-present image P1 into the plurality of image blocks B and calculates the nonflatness for each of the image blocks B. Then, based on the result of the determination of whether or not the nonflatness is less than or equal to the predetermined value, the image pickup device 100 identifies the image blocks B with a nonflatness of at most the predetermined value. Specifically, for the nonflatness, the variation amount calculation section 6b calculates the amount of variation among the pixel values in the image block B. The nonflatness determination section 8f determines whether or not the calculated amount of variation among the pixel values is less than or equal to the predetermined value. Based on the determination result, image blocks with a nonflatness of at most the predetermined value are identified. Thus, the image blocks with a nonflatness of at most the predetermined value can be appropriately identified based on the generation of an extraction background image.

The image pickup device then determines whether or not the number of the image blocks with a nonflatness of at most the predetermined value accounts for at least a predetermined rate of the total number of image blocks. Upon determining that the number of the image blocks with a nonflatness of at most the predetermined value accounts for at least the predetermined rate of the total number of image blocks, the image pickup device generates an extraction background image from the image blocks.

Thus, the image pickup device 100 can appropriately generate an extraction background image from the subject-present image P1 by the above-described processing. This eliminates the need to obtain a background image separately from the subject-present image P1. Hence, the subject area can be easily extracted from the subject-present image P1.

Furthermore, an extraction background image is generated which is in almost the same color as that of the image areas with a nonflatness of at most the predetermined value. Thus, an image area in a color different from that of the extraction background image can be determined to be a subject area. Even if the subject area includes separate areas, each area in a color different from that of the extraction background image can be appropriately extracted.

The present invention is not limited to the above-described embodiments. Various improvements may be made to the embodiments and the design of the embodiments may be changed, without departing from the spirits of the present invention.

For example, the image pickup device 100 may include synthesized image generation means (not shown in the drawings) for synthesizing the subject area in the subject clipped image P3 with an image other than the subject-present image P1 to generate a subject synthesized image. For example, the synthesized image generation means synthesizes the subject clipped image P3 with a background image (a background image P5 in FIG. 7A) to generate a subject synthesized image (a subject synthesized image P6 in FIG. 7B).

In the process of generating a subject synthesized image, the image data on the subject clipped image P3 is processed such that the color of the background image P5 is transmitted through the pixels covered with the filled-in portion (which is other than the subject S) of the mask image data. On the other hand, no processing is executed on the pixels in the subject portion so that the color of the background image P5 is prevented from passing through these pixels. Thus, the subject synthesized image P6 can be generated in which the subject area in the subject clipped image P3 is superimposed on the background image P5.

When a subject synthesized image is generated, the background image need not necessarily be used as the image other than the subject-present image P1. For example, a predetermined pattern image such as a word balloon (for example, a pattern image P8 in FIG. 8) may be used or synthesized with the subject clipped image P3 to generate a subject synthesized image (for example, a subject synthesized image P7 in FIG. 7C).

Furthermore, the image pickup device 100 may store the generated subject synthesized image in the recording medium (storage means) 9.

The predetermined background image P5 and the predetermined pattern image P8 may be stored in the recording medium 9 or in a separate dedicated storage device provided in the image pickup device 100.

Thus, various background images (for example, the background image P5) or pattern images (for example, the pattern image P8) may be synthesized with the subject clipped image P3 to generate various subject synthesized images P6, P7, and the like. As a result, a very interesting image involving the subject clipped image P3 can be obtained. Hence, the possibility of utilizing the subject clipped image P3 can be significantly increased, thus providing a more convenient image pickup device 100.

Furthermore, the image pickup device 100 may include correction means (not shown in the drawings) for subjecting the subject-present image P1 to trapezoid correction.

Figure 5C:
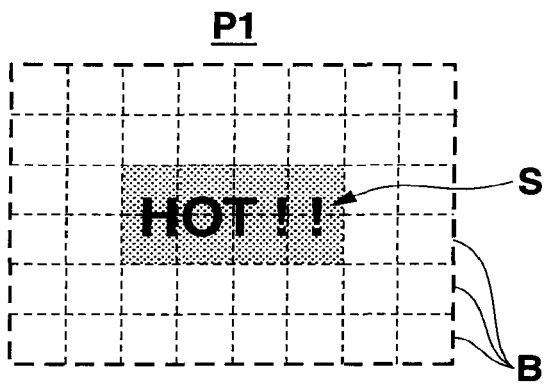

For example, if an image of the subject S is to be taken which is written on the whiteboard W or the like as shown in FIGS. 5A, 5B, and 5C, the whiteboard W is not necessarily held parallel to the lens section 1. Thus, if the whiteboard W is tilted to the lens section 1 instead of being held parallel to the lens section 1, then in a taken image, a side of the whiteboard S located close to the lens section 1 is shown larger, whereas a side of the whiteboard S located away from the lens section 1 is shown smaller. As a result, the subject S suffers trapezoidal distortion.

Thus, correction means for trapezoid correction is provided in the image pickup device to apply trapezoid correction to the subject-present image P1 containing the subject S with trapezoidal distortion. The correction means executes a perspective conversion process as trapezoid correction based on the four corners of the whiteboard W contained in the subject-present image P1. Thus, the correction means corrects trapezoidal distortion in the subject-present image P1. Then, the image area specification section 8a specifies image areas which are contained in the subject-present image P1 subjected to trapezoid correction by the correction means and which have a nonflatness of at most the predetermined value.

Then, even if the subject S contained in the subject-present image P1 suffers trapezoidal distortion, a convenient undistorted subject area can be extracted from the subject-present image P1. That is, if a character string or the like written on the whiteboard W is the subject S, distortion caused by the relative positions of the whiteboard W and the image pickup device 100 can be eliminated from the character string extracted by the subject clipping process. Therefore, a well-looking character string can be extracted.

Furthermore, the image pickup device 100 may include color changing means (not shown in the drawings) for changing the color of the extracted subject area image. The color of the subject area image may be changed to, for example, one selected from a predetermined color preset.

That is, changing the color of the subject area image allows subject area images in various colors to be obtained from one subject clipped image P3. This sharply increases the possibility of utilizing the subject clipped image P3, thus providing a more convenient image pickup device 100.

Additionally, in the above-described embodiment, the mask image data and the image data on the subject clipped image P3 are saved in a single file so as to be associated with each other. However, the mask image data and the image data on the subject-present image P1 may be saved to the recording medium (storage means) 9 in a single file so as to be associated with each other. In this case, the following two modes are preferably prepared for reproduction of the file: the mode in which the subject-present image P1 is reproduced, and the mode in which during reproduction, the mask image data is applied and synthesized with the subject clipped image P3 for display.

Furthermore, in the subject clipping process shown in the flowchart in FIG. 2 described above is terminated if background generation fails. However, a routine may be added which obtain an image only of the background to generate an extraction background image if no extraction background image can be generated from the subject-present image P1. Then, even if no extraction background image can be generated from the subject-present image P1, the subject clipped image P3 can be obtained from the subject-present image P1 by obtaining an image only of the background to generate an extraction background image.

The image pickup device 100 may further include optical character recognition means operating during the subject clipping process to perform optical character recognition (OCR) based on the subject S. Thus, if the subject S is a character string, the subject S can be recognized as a character string during the subject clipping process. Therefore, the subject S can be more accurately extracted.

Moreover, the configuration of the image pickup device 100 illustrated in the above-described embodiments is only an example. The present invention is not limited to this configuration.

In addition, in the above-described embodiments, the functions of the specification means, the determination means, the extraction background generation means, and the subject extraction means are implemented when the image processing section 8 drives the means under the control of the CPU 13. However, the present invention is not limited to this aspect. The functions may be implemented when the CPU 13 executes predetermined programs or the like.

That is, a program is stored in a program memory (not shown in the drawings); the program includes an image area specification process routine, a determination process routine, an extraction background generation process routine, and a subject extraction process routine. Then, the image area specification process routine allows the CPU 13 to function as specification means for specifying an image area in which the subject-present image P1 taken by the image taking means has a nonflatness of at most the predetermined value. Alternatively, the determination process routine may allow the CPU 13 to function as determination means for determining whether or not the range of the image areas in the subject-present image which are specified by the specification means and which have a nonflatness of at most the predetermined value is greater than or equal to the predetermined range. Alternatively, the extraction background generation process routine may allow the CPU 13 to function as extraction background generation means for generating an extraction background image used to extract a subject area in the subject-present image P1 containing the subject S, from the subject-present image P1 if the range of the image areas determined by the determination process to have a nonflatness of at most the predetermined value is greater than or equal to the predetermined range. Alternatively, the subject extraction process routine may allow the CPU 13 to function as subject extraction means for extracting the subject area from the subject-present image P1 to obtain the subject area image, based on information on the difference between each pixel in the extraction background image and the corresponding pixel in the subject-present image P1.

Similarly, the synthesized image generation means, the correction means, and the color changing means may be implemented when the CPU 13 executes predetermined programs or the like.

In the above description, ROM is used as a medium from which a computer can read the program according to the present invention. However, the present invention is not limited to this example.

Another applicable computer-readable medium may be a nonvolatile memory such as a flash memory, a portable recording medium such as CD-ROM, or the like.

Furthermore, as a medium that provides the data for the program according to the present invention, a carrier wave may be applied to the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an obtaining section configured to obtain a background image only of a background in which a subject is not present, and a subject-present image in which a subject is present;
   a determination section configured to specify an image area which is contained in the subject-present image obtained by the obtaining section and in which a value of nonflatness is less than or equal to a predetermined value, and to determine whether or not a range of the specified image area is greater than or equal to a predetermined range;
   a background generation section configured to generate an extraction background image used to extract a subject area from the subject-present image based on information on the image area when the determination section determines that the range of the image area is greater than or equal to the predetermined range;
   a judgment section configured to determine whether generation of the extraction background image by the background generation section has succeeded or failed; and
   a subject extraction section configured to extract the subject area from the subject-present image based on the generated extraction background image when the judgment section determines that the generation of the extraction background image has succeeded, and to obtain the background image by the obtaining section and extract the subject area from the subject-present image based on the obtained background image when the judgment section determines that the generation of the extraction background image has failed;
   wherein the determination section includes:
      a division section configured to divide the subject-present image obtained by the obtaining section into a plurality of image blocks;
      a first determination section configured to determine whether or not a value of the nonflatness of each of the plurality of image blocks resulting from the division by the division section is less than or equal to a predetermined value; and
      a second determination section configured to determine whether or not a number of image blocks, which are determined by the first determination section to have the value of the nonflatness less than or equal to the predetermined value, accounts for at least a predetermined rate of a total number of image blocks; and
   wherein the background generation section generates the extraction background image from the image blocks when the second determination section determines that the number of image blocks, which have the value of the nonflatness less than or equal to the predetermined value, accounts for at least the predetermined rate of the total number of image blocks.

2. An image processing method performed by an image processing device comprising a computer, the method comprising:
   an obtaining step of obtaining a background image only of a background in which a subject is not present, and a subject-present image in which a subject is present;
   a determination step of, under control by the computer, specifying an image area which is contained in the subject-present image obtained in the obtaining step and in which a value of nonflatness is less than or equal to a predetermined value, and determining whether or not a range of the specified image area is greater than or equal to a predetermined range;
   a background generation step of, under control by the computer, generating an extraction background image used to extract a subject area from the subject-present image based on information on the image area when it is determined in the determination step that the range of the image area is greater than or equal to the predetermined range;

a judgment step of, under control by the computer, determining whether generation of the extraction background image in the background generation step has succeeded or failed; and a subject extraction step of, under control by the computer, extracting the subject area from the subject-present image based on the generated extraction background image when it is determined in the judgment step that the generation of the extraction background image has succeeded, and obtaining the background image by the obtaining step and extracting the subject area from the subject-present image based on the obtained background image when it is determined in the judgment step that the generation of the extraction background image has failed;

wherein the determination step includes:

a division step of, under control by the computer, dividing the subject-present image obtained by the obtaining step into a plurality of image blocks;

a first determination step of, under control by the computer, determining whether or not a value of the nonflatness of each of the plurality of image blocks resulting from the division by the division step is less than or equal to a predetermined value; and a second determination step of, under control by the computer, determining whether or not a number of image blocks, which are determined by the first determination step to have the value of the nonflatness less than or equal to the predetermined value, accounts for at least a predetermined rate of a total number of image blocks; and wherein the background generation step is performed to generate the extraction background image from the image blocks when the second determination step determines that the number of image blocks, which have the value of the nonflatness less than or equal to the predetermined value, accounts for at least the predetermined rate of the total number of image blocks.

3. A non-transitory computer-readable storage medium having a program stored thereon which controls a computer in an image processing apparatus, the program controlling the computer to execute functions comprising:

an obtaining function of obtaining a background image only of a background in which a subject is not present, and a subject-present image in which a subject is present;

a determination function of specifying an image area which is contained in the subject-present image obtained by the obtaining function and in which a value of nonflatness is less than or equal to a predetermined value, and determining whether or not a range of the specified image area is greater than or equal to a predetermined range;

a background generation function of generating an extraction background image used to extract a subject area from the subject-present image based on information on the image area when the determination function determines that the range of the image area is greater than or equal to the predetermined range;

a judgment function of determining whether generation of the extraction background image by the background generation function has succeeded or failed; and a subject extraction function of extracting the subject area from the subject-present image based on the generated extraction background image when the judgment function determines that the generation of the extraction background image has succeeded, and obtaining the background image by the obtaining function and extracting the subject area from the subject-present image based on the obtained background image when the judgment function determines that the generation of the extraction background image has failed;

wherein the determination function includes:

a division function of dividing the subject-present image obtained by the obtaining function into a plurality of image blocks;

a first determination function of determining whether or not a value of the nonflatness of each of the plurality of image blocks resulting from the division by the division function is less than or equal to a predetermined value; and a second determination function of determining whether or not a number of image blocks, which are determined by the first determination function to have the value of the nonflatness less than or equal to the predetermined value, accounts for at least a predetermined rate of a total number of image blocks; and wherein the background generation function generates the extraction background image from the image blocks when the second determination function determines that the number of image blocks, which have the value of the nonflatness less than or equal to the predetermined value, accounts for at least the predetermined rate of the total number of image blocks.

* * * * *